June 13, 1933.    A. R. GOLRICK ET AL    1,914,118
LOAD HANDLING MECHANISM
Filed Aug. 23, 1930    6 Sheets-Sheet 1

Inventors
Albert R. Golrick
and
Robert N. McBean
By Bates, Golrick & Teare
Attorneys

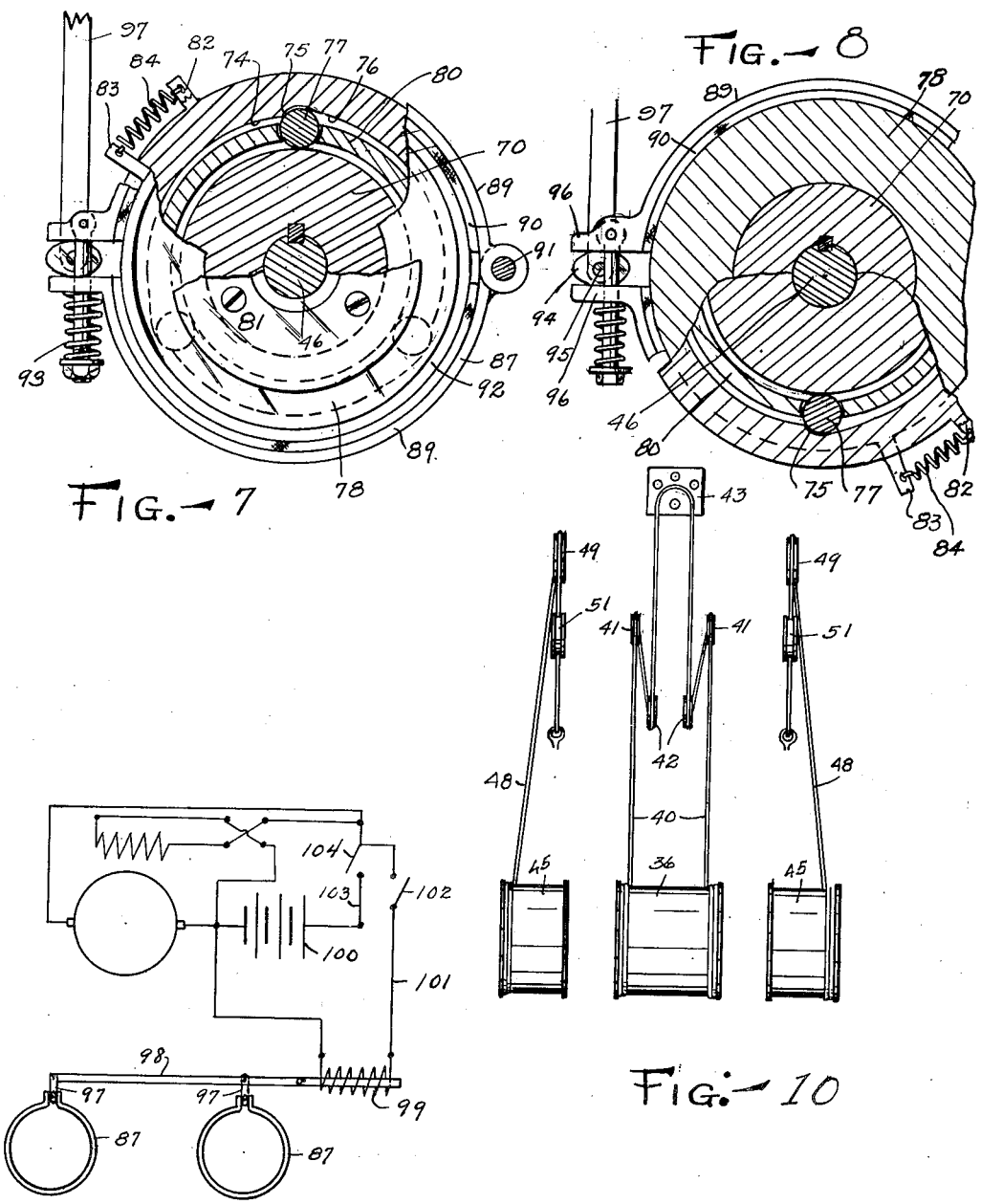

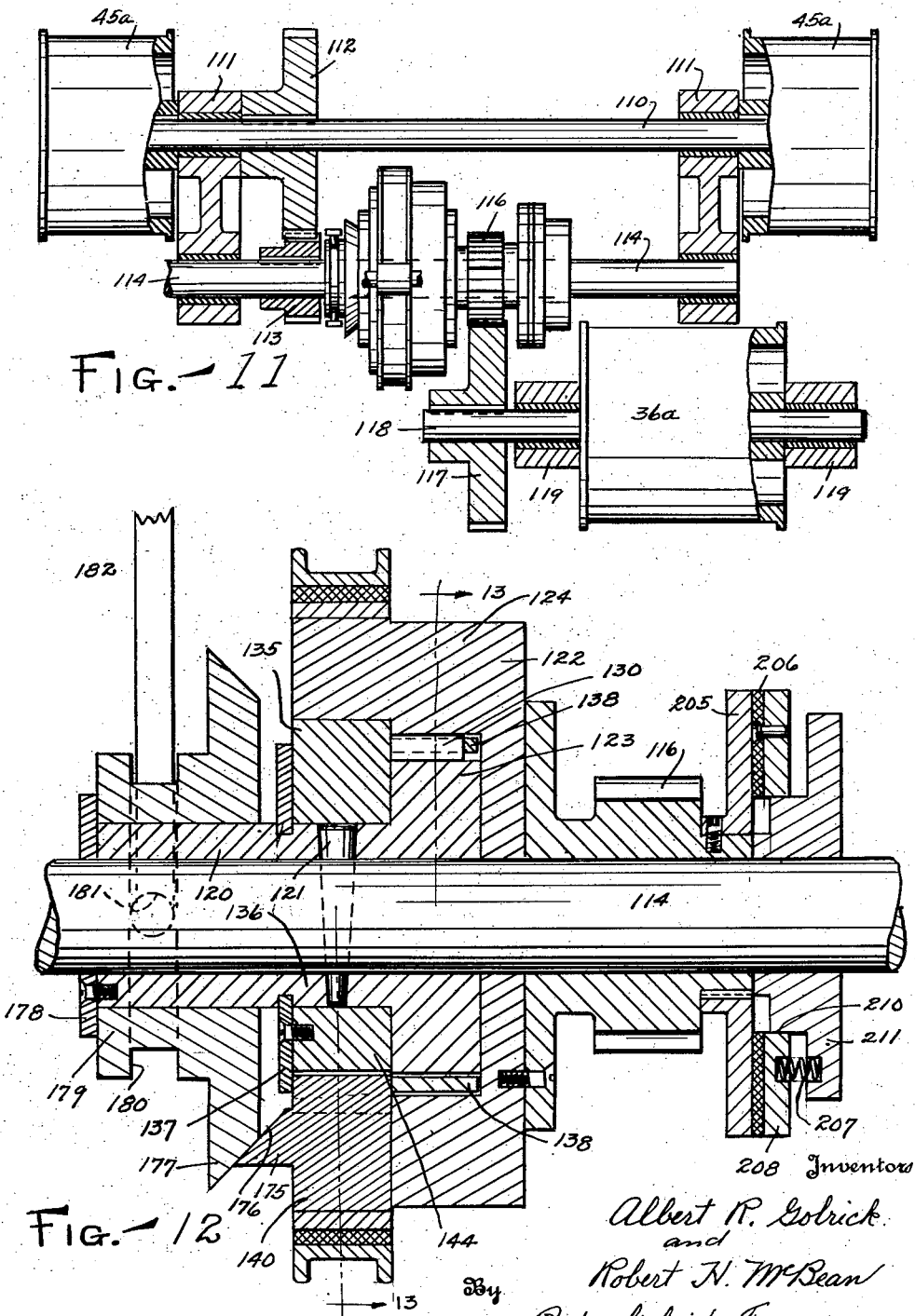

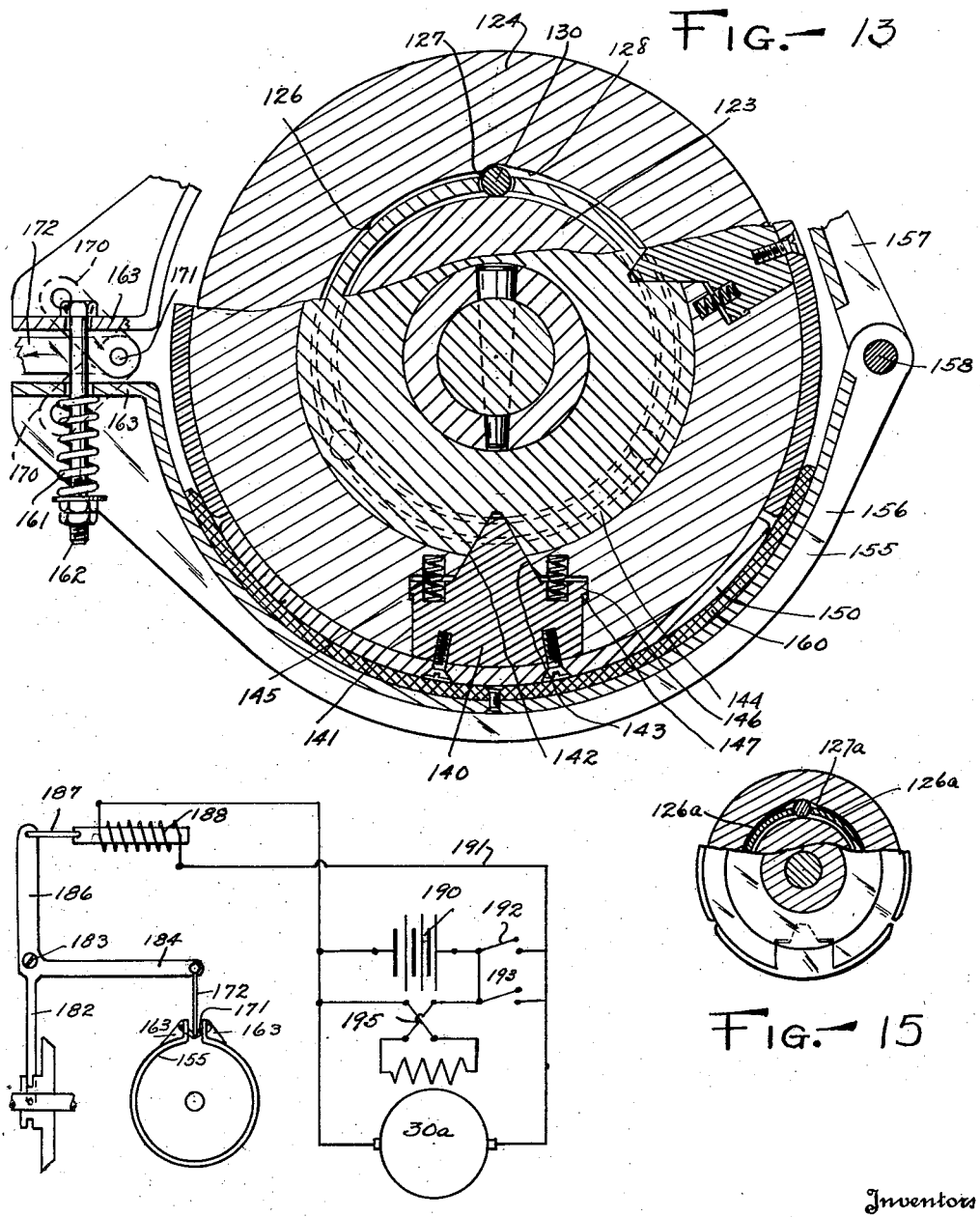

Patented June 13, 1933

1,914,118

UNITED STATES PATENT OFFICE

ALBERT R. GOLRICK, OF SHAKER HEIGHTS, AND ROBERT H. McBEAN, OF BEREA, OHIO, ASSIGNORS TO THE ELWELL PARKER ELECTRIC COMPANY, OF CLEVELAND, OHIO, A CORPORATION OF OHIO

LOAD HANDLING MECHANISM

Application filed August 23, 1930. Serial No. 477,202.

This invention relates to a load handling mechanism and is especially adapted for use on industrial trucks, when it is desirable to provide the truck with a load raising and tilting mechanism.

The general object of this invention is to provide a simple and efficient mechanism to raise and tilt a loaded platform or container, and which will permit flexibility of control.

A more specific object is to provide an improved mechanism and control therefor, and which will tilt a liftable platform or load-carrying body, and wherein the tilting movement will be independent of the raising or lowering of the platform or body.

A further object is to provide a mechanism to control a liftable platform and a load-tilting mechanism in such a manner that a common source of power may be utilized to operate the tilting mechanism and the lifting mechanism and wherein the tilting mechanism may be operated simultaneously with, and independently of, the lifting mechanism.

A further object is to provide a duplex load handling mechanism, having a plurality of load lifting cable drums, the mechanisms being adapted to operate one of the drums independent of the other and from a common source of power without necessitating a multiplicity of controls therefor.

Another object is to provide a clutch mechanism for a plurality of load lifting cable drums and which will permit the drums to be operated simultaneously from a common power unit and which will permit one of the drums to be operated while another is stationary.

A further object is to provide a clutch for a load lifting mechanism, which will be positive in movement, insure against accidental dropping of the load, and which will be inactive when the load is removed from the lifting cables.

Other objects and features of the invention will become apparent from the following description relating to the accompanying drawings and the essential characteristics will be summarized in the claims.

Figure 1:
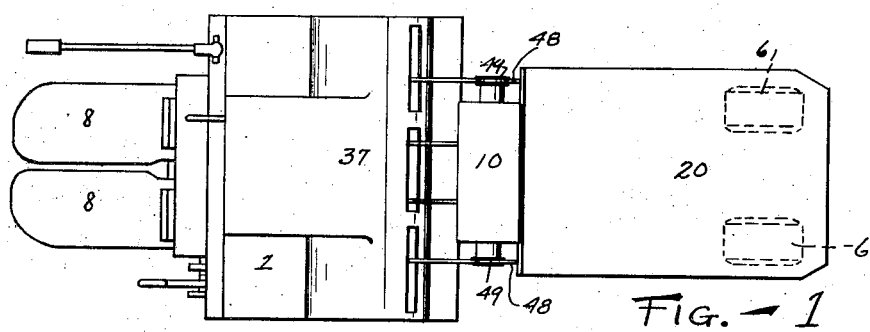
Figure 2:
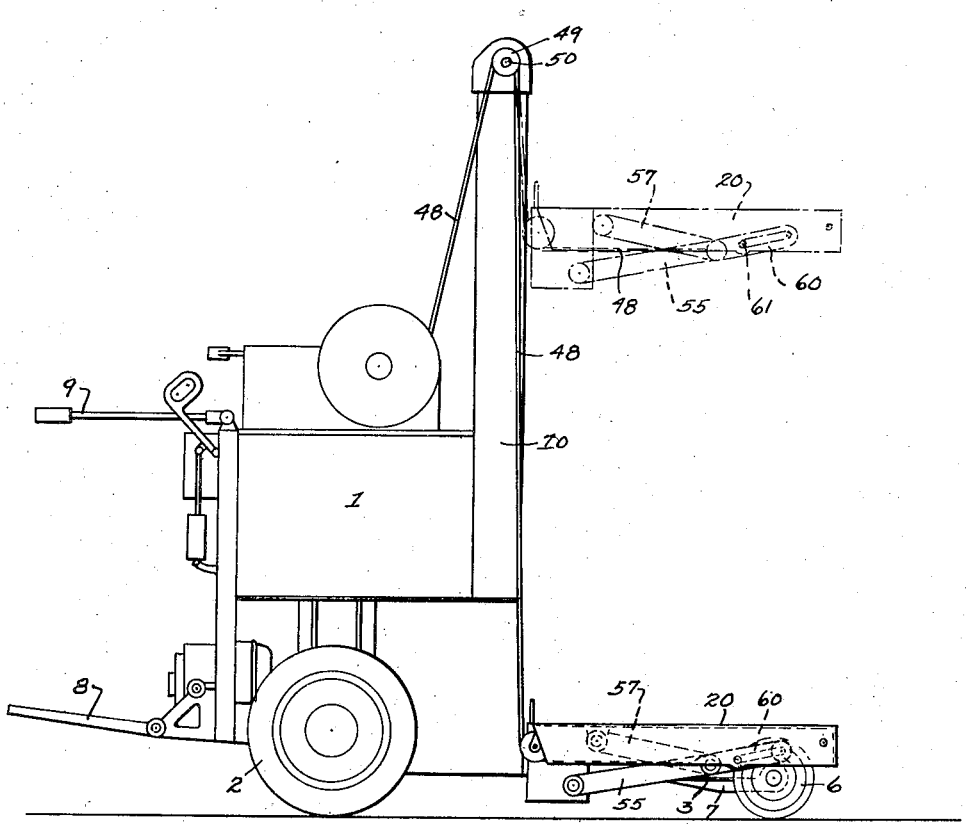
Figure 3:
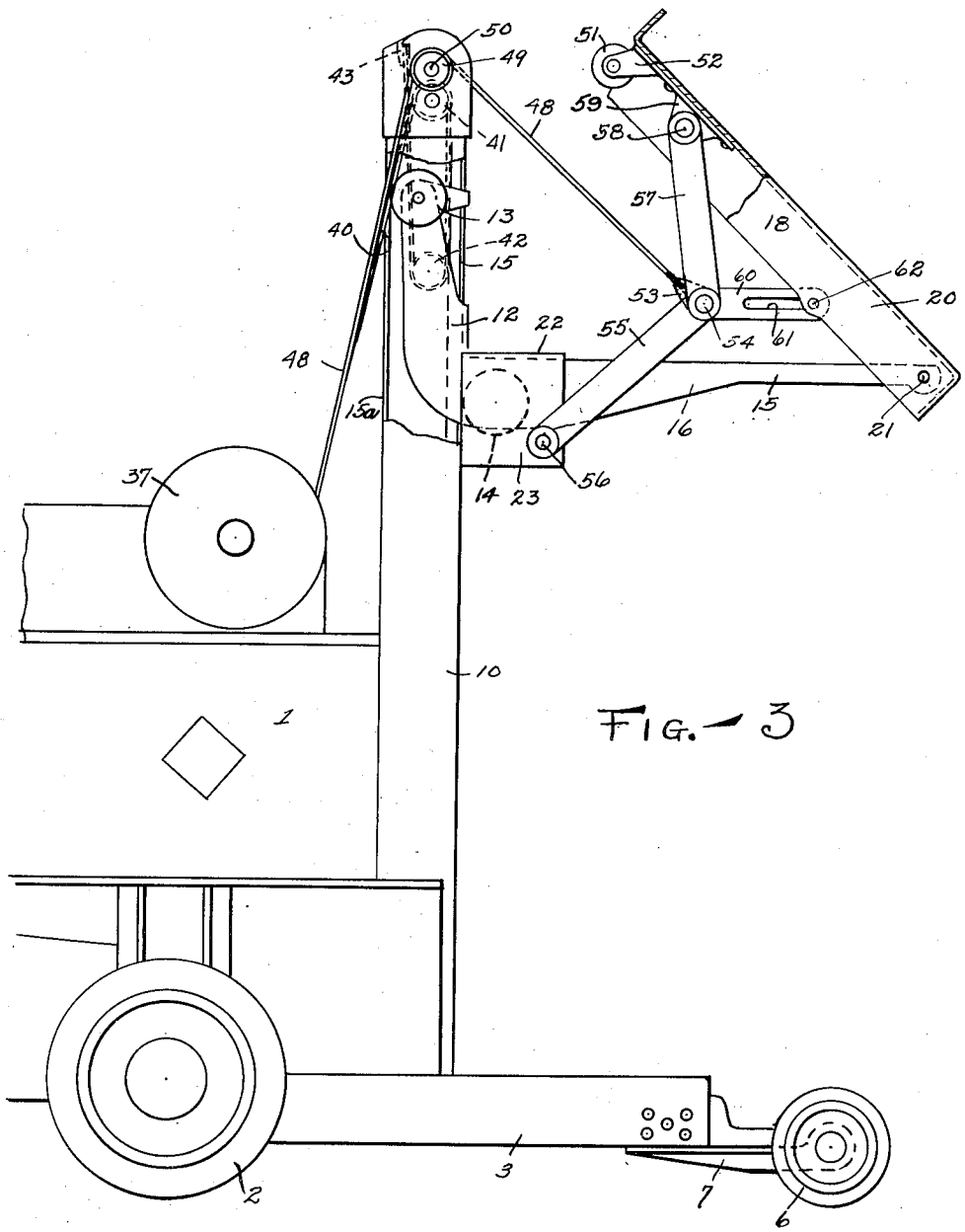
Figure 4:
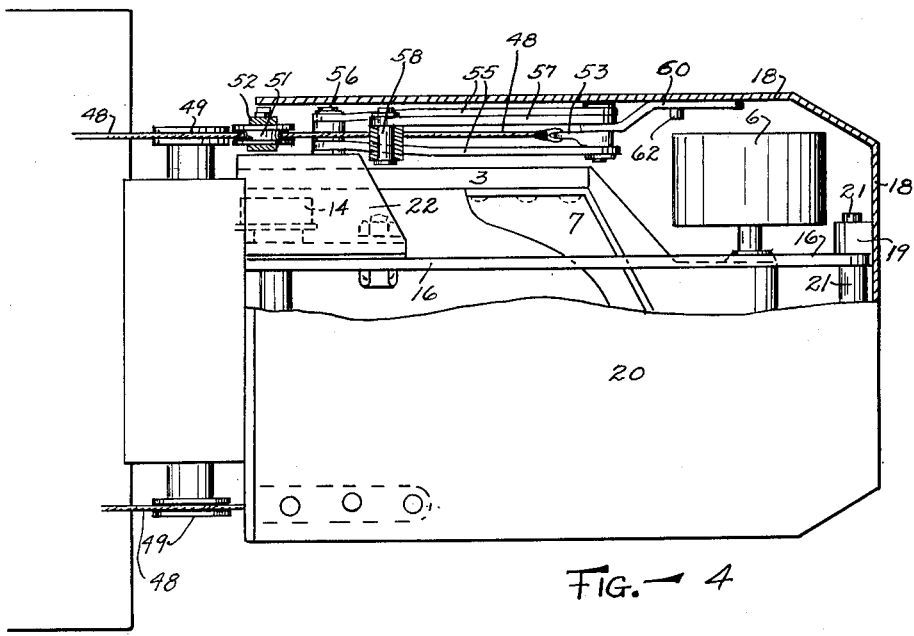
Figure 5:
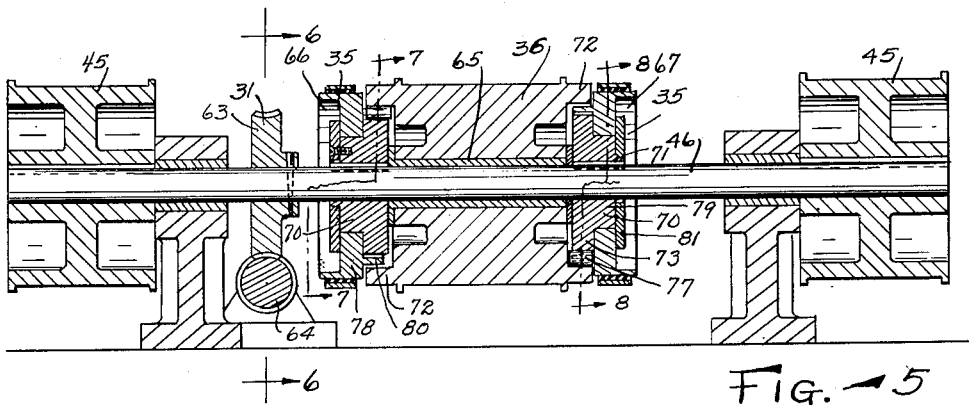
Figure 6:
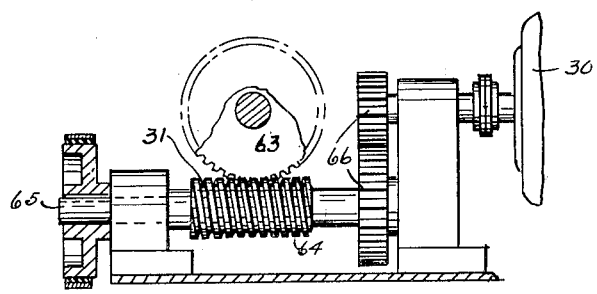

In the drawings, Fig. 1 illustrates a plan view of an industrial truck, incorporating my invention; Fig. 2 is a side elevation of the truck shown in Fig. 1, and illustrates the load carrying platform in a normal or untilted position; Fig. 3 is a fragmentary side elevation of the forward portion of the truck, showing the relative position of the various parts of a platform tilting mechanism in a tilted position; Fig. 4 is a fragmentary plan view of the forward or platform portion of the truck, wherein a portion of the platform is broken away to illustrate the arrangement of the parts which comprise the tilting mechanism; Fig. 5 is a vertical section through the cable-winding drums and illustrates one form of a clutching mechanism, Fig. 6 is a vertical section, and is indicated by the lines 6—6 on Fig. 5; Figs. 7 and 8 are transverse sections through the clutching mechanism, and are indicated by the lines 7—7 and 8—8 respectively on Fig. 5; Fig. 9 is a diagrammatic illustration of the electric circuits employed to control the clutch mechanism illustrated in Figs. 5 to 8 inclusive; Fig. 10 is a diagrammatic illustration of the cable arrangements used for lifting and tilting the platform; Fig. 11 is a plan, partially in section, and illustrates a modified form of clutching mechanism; Fig. 12 is a horizontal section, through the axis of the clutch mechanism illustrated in Fig. 11; Fig. 13 is a vertical, transverse section through the clutching mechanism, shown in Fig. 11, and is indicated by the line 13—13 on Fig. 12; Fig. 14 is a diagrammatic illustration of the electrical circuits which control the clutch illustrated in Figs. 11–13; Fig. 15 is a vertical, transverse section of a modified form of the clutching mechanism.

As shown, the present embodiment of our invention is associated with an industrial truck of the general type shown in the prior patent to C. E. Cochran, No. 1,399,542, issued December 6, 1921, but it is understood that the novel arrangement of elements herein described and claimed may be adapted for use in any analogous mechanism.

The truck illustrated comprising, in general, a body portion which forms a battery housing 1 and suitable frame members which support a power drive including a pair of traction wheels 2. The frame work has a forwardly extending low-swung extension 3 at the end of which are a pair of dirigible wheels 6, mounted on brackets 7. A suitable controlling arrangement is provided for the wheels 6, which includes the usual traction wheel linkage and a steering arm 9 (Figs. 1 and 2) which is within reach of the operator as he stands upon a pair of pivoted platform members 8, which members also serve to form part of the truck control. At the forward portion of the battery housing is a rigid upright structural frame 10, which provides a vertical trackway for a carriage 12, which in turn supports a platform 20.

The carriage has a vertically extending portion partially housed by the side members forming the structure 10, and is provided with a pair of rollers 13 and 14 which coact with flanges 15a on the side of the structural members of the frame 10 to guide the carriage for vertical movement. The platform is supported by a horizontal forward extension 15 of the carriage 12 which comprises a pair of rigid bars 16, one of which is shown in plan in Fig. 4.

The platform has downwardly formed flanges 18 which, adjacent the front of the platform, carry a pair of brackets 19, one of which is shown in Fig. 4. The brackets 19, in turn, carry a hinge bar 21 which extends through and is supported by the horizontal bars 16. The rear end of the platform rests on a pair of brackets 22 which are secured to the members 16 and extend outwardly therefrom, as illustrated in Fig. 4. These members 22 are U shaped and inverted to provide depending side flanges 23 at each side of the platform.

The platform may be raised and lowered by the operation of a duplex cable hoist mechanism, arranged so that a cable or a set of cables, which raises and permits lowering of platform, can be arrested in its activity and released from the source of power, and the cables are prevented from permitting the platform or load to drop by braking mechanism, there being a second cable or set of cables with attendant connections to the power means, which can be operated to cause the load or the platform supporting the load to be tilted at any elevated position within the operative range of the load elevating platform. The platform may be raised and lowered by means of a cable hoist, the primary power element of which may comprise an electric motor 30, powered from the truck batteries and suitably controlled from the operator's position; suitable reduction gearing 31, and a clutch mechanism 35 (hereinafter more fully described), transmit the power to a winding drum 36, mounted on the battery housing 1, and within a housing 37. The drum 36 carries a pair of cable stretches 40 which pass upwardly over pulleys 41, then downwardly around pulleys 42 which move with the carriage 12, and then upwardly to an anchor 43 suspended from the top of the frame 10. Any suitable safety device may be used to cut off the power to the motor which drives the drum 36 whenever the carriage has reached its uppermost position.

For tilting the platform I prefer to utilize the motor 30 heretofore mentioned as driving the drum 36 to raise and lower the platform. The motor 30, through suitable reduction gearing 31, drives a pair of drums 45, which are drivingly mounted on a common shaft 46 which is driven by the reduction gearing. Suitably fastened to the drums are cable stretches 48 which pass upwardly over sheaves 49 carried by a shaft 50 mounted adjacent the top of the structure 10. The cable stretches 48 then pass downwardly underneath a pair of flanged guides or sheaves indicated at 51 and which are secured to brackets 52, which in turn are fastened to the rear edge of the platform, (see Fig. 3). The cables 48 then pass forwardly from the sheaves 51 to suitable eyes 53 mounted on pivot bars 54 which form the connections between respective toggle pairs, one of which is arranged at each side of the platform. Each toggle comprises a pair of rigid bars 55, one end of which is pivoted as at 56 to the carriage brackets 22. The other end of the bars or links 55 support the respective pivot bars 54. Pivoted to the pivot bars 54, are rigid links 57 the other ends of which are pivotally anchored on studs 58 carried by the brackets 59 depending from the under surface of the platform.

To prevent excessive tilting, and to insure the return of the platform to its normal or untilted position a third link 60 is pivotally secured to the pivot bar 54, the other end of the link 60 has an elongated slot 61 which coacts with a stud 62 carried by the flange 18 of the platform thereby limiting the tilting movement of the platform 20.

In the form of truck illustrated and described it will be noted that whenever the platform is raised or lowered on the frame 10, it is desirable, in order that the platform be maintained in a horizontal position during such movement, to raise the platform tilting cable simultaneously with the platform lifting cable. It is also desirable, in a truck of this nature, to enable the platform to be tilted in any position or elevation of the latter relative to the frame 10, and it is also desirable that the tilting operation be performed while the carriage is stopped or is in a fixed position relative to the frame 10, and in such a manner that the elevation of the lower or forward most end of the platform remains practically unchanged during the tilting movement of the platform. Therefore, when a single motor or source of power is to be used to operate both the load lifting drum and the tilting drums, it is desirable to interpose a clutch mechanism between the two sets of drums. It will be noted that the tilting drums operate whenever the lifting drums do and also they operate to tilt the platform when the lifting drum is idle. It therefore follows that the tilting drums may be rigidly secured to the drive shaft, but that the clutch 35 must be interposed between the load lifting drum and the power unit.

The load-lifting drum, is the drum which is clutched or unclutched from the driving means, while the tilting drum always operates when either the tilting operation or the lifting operation is being performed. Therefore the clutch mechanism 35 must be accurate and one which will prevent accumulated error in the winding of the cables and thereby prevent either the load-lifting cables or the tilting cables to gain relative to the other which error would possibly result in the tilting of the load before it was desired, thereby causing damage to the truck and possible damage to the load.

Figs. 5 to 9 inclusive illustrate one form of mechanism which may be used to clutch the load lifting drum to the power shaft. As illustrated in Fig. 5 the tilting drums 45 are drivingly secured to a shaft 46 by means of suitable keys. The shaft 46 is driven by means of a gear 63 rigidly secured to the shaft, and which coacts with a worm 64 mounted on a shaft 65 and driven by suitable gears 66 from the motor 30, which is mounted in the housing 36. This construction causes the tilting cable drums to be operated whenever power is supplied to the motor 30. The load lifting cable winding drum 36 is rotatively mounted on a bushing 65 carried by the shaft 46, and is drivingly connected to the shaft by a pair of roller clutches which are generally indicated at 66 and 67.

The clutches and their immediate coacting parts, as illustrated in Figs. 5 to 9 inclusive will now be described. Each of these mechanisms include a driving member 70 which is rigidly secured to the shaft 46 by means of a suitable key 71, there being one such member adjacent each side of the drum 36. The drum is provided with annular flanges 72 which overhang portions 73 of the driving members 70. The internal surface of the flanges have several outwardly extending portions, preferably made up of a concentric portion 74 then an inward step 75 and a tangential or curved portion 76, joining the inward step with the next concentric portion. These portions, on one side of the drum, are right hand and on the other side are left hand, this governs the driving direction of the clutches. The third member of the clutch comprises movable rollers 77 which are interposed between the driving member and the flanges 72 of the drum, and a retainer ring 78 which positions the rollers equidistantly. The retainer ring comprises a plate journalled on a reduced portion 79 of the driving member and having an interrupted annular portion 80 which projects between successive rollers 77. The ring 78 is held in place against displacement by a plate 81 mounted on the hub portion 78 of the driving member.

The clutches are normally held in an engaged or driving position. To this end the drum is provided with outwardly extending lugs 82 which are joined to similar lugs 83, which extend outwardly from the plates 70, by suitable tension springs 84. The action of the springs being such as to urge the rollers into contact with both the driving member and the flange of the drum so that the latter will be driven thereby.

To release the clutches suitable brakes 87 are provided which restrain the movement of the plates 70 thereby forcing the rollers into the deepest portion of the recess and breaking the driving connection between the shaft and the drum. The brakes 87 may be on any well known type, but as illustrated, each brake comprises a pair of shoes 89 which are provided with suitable brake or friction lining 90 and which are pivoted at 91 to a stationary part of the truck structure and held in contact with an annular portion 92 of the plates 70 by a suitable compression spring 93. The brakes are expanded or released from contact with the plate by a cam 94 mounted on a suitable rock shaft 95 and coacting with lugs or ears 96 of the brake members to spread the latter.

As illustrated in Fig. 9 the brakes are operated simultaneously by means of levers 97 rigidly secured to the shafts 95 and joined together by a link 98 which is operated by a solenoid 99 which receives its power from a suitable battery 100 through wiring 101, which is supplied with a switch 102, preferably mounted in a place convenient to the operator of the truck. It will be noted from the diagram that the switch 102 is arranged in series with the main motor circuit 103 in such a manner that the circuit 101 will be open unless both the main controller switch 104 and the brake control switch 102 are closed. Figs. 11 to 14 inclusive illustrate a modified form of clutch, which insures positive braking of the drum thereby insuring against accidental dropping of the load. This clutch also is constructed in such a manner, that when the platform is lowered so that the carriage rests on the frame extension, and the load cable 40 is relieved of the weight of the carriage, the clutch will prevent further unwinding of the drum and thereby prevent the cable from becoming slack which might result in its jumping the sheaves, becoming caught, and possibly from being sheared, thereby dropping the load and damaging the truck and the load.

The clutch illustrated in Figs. 11 to 14 is, in many respects similar to the clutches heretofore described. It is however, more rugged in construction and enables the brake mechanism to act on the drum and simultaneously hold the clutch in a released or non-driving position. As illustrated in Fig. 11 the tilting cable drums 45a are secured to a shaft 110 supported in bearings 111 carried by the frame of the truck. Drivingly secured to the shaft 110, is a gear 112 which meshes with a smaller gear 113 rigidly secured to a power shaft 114 which is driven by a suitable motor (not shown) and which is mounted in the bearings 111. The shaft 114 carries a clutch, generally indicated at 115, which transmits the movement of the shaft to a spur gear 116 which meshes with a gear 117 rigidly secured to a shaft 118 mounted in bearings 119 and on which is drivingly mounted the load lifting drum 36a. The ratio of the gears 113, 112 and 116, 117 being the same to the end that the drums 45a and 36a will be driven at the same speed.

The clutch 115 is similar to the clutches 35. It includes a driving member 120 secured to the shaft 114 by a pin 121. Adjacent the driving member is a driven member 122 which overhangs a portion 123 of the driving member. The inner surface of the overhanging portion 124 of the driven member is generally concentric as shown at 126 but has several irregular or undercut portions which are cut sharply into the surface at one end as at 127 and then tangentially or gradually curved towards the concentric surface as at 128. The third member of the clutch comprises a series of rollers 130 which are interposed between the portion 123 of the driving member and the overhanging portion 124 of the driven member, there being one roller to each recess or undercut portion in the driven member. The arrangement being such that when the roller occupies the extreme left hand portion of the recess 127 (see Fig. 13) that the driving and driven members may rotate independently of each other, there being a slight amount of clearance between the roller and the members, however when the roller is urged toward the right (Fig. 3) or to the shallower portion of the recess, the driving and driven members will be driven simultaneously, being locked together by the roller.

The operation of the clutch is controlled by a ring 135 which is rotatably mounted on the hub 136 of the driving member and retained in place thereon by a split collar 137. This ring also underlies the overhanging portion 124 of the driven member and has an outwardly extending annular portion 138 which forms a retaining cage for the rollers 130. It follows therefore that relative movement between this control ring and the driven member will cause the rollers to assume their active or inactive positions as is desired. Suitable blocks 140 which slide radially in recesses 141 in the driven member have wedge shaped noses 142 which enter the notches 143 in the body portion 144 of the control ring 135 and serve to position the ring relative to the driven member. These blocks are normally urged outward, radially, by suitable compression springs 145, such outward movement being limited by ears 146 of the block, coacting with shoulder 147 of the recesses. In Fig. 13 these blocks are shown in their innermost position, in which position the clutch rollers 130 are in the deepest portion of the recess 127 and the clutch is disengaged or in a non-driving position.

The brake, such as illustrated in Fig. 13 serves the dual purpose of operating the blocks 140 to disengage the rollers thereby rendering the clutch idle and applying a braking force to the driven member which, acting through the reduction gearing 116 and 117 prevents the rotation of the load lifting drum 36a. As shown in Fig. 13 the blocks 140 have arcuate shaped heads 150, the inner surface of which, when the blocks are in their innermost position, contacts with the outer surface of the driven member. The heads of the several blocks form substantially a continuous band, the outer surface of which is acted on by the brake 155. The brake comprises a pair of arcuate strapped arms 156 and 157 pivoted at 158 to a stationary pin or stud. Each arm has secured to its inner surface a suitable friction band or brake lining 160 which acts on the blocks 140. The brake is normally closed or held in position where it engages the blocks 140 by a compression spring 161 carried by a stud 162 mounted in ears 163 of the brake arms. From the foregoing it is seen that when the brake is applied it acts through the blocks 140 to disengage the clutch rollers 130 and acts directly through the heads of the blocks to brake or stop the movement of the driven member and drum 36a.

The brake is operated or opened, to engage the clutch, by a toggle which comprises a pair of rigid arms or links 170 one end of each being pivoted to a pin 171 the other ends being pivoted to respective ears 163 of the brake members, a suitable link 172 operates on the pivot pin 171 to force the brake members apart to engage the clutch.

To insure engagement of the clutch when the brake is released it is desirable to provide means, independent of the spring 147, to positively return the blocks 140 to their outermost positions. To this end, each block 140 is provided with a lug 175 (Fig. 12) which has a tapered surface 176 adapted to be acted on by a cone 177 to mechanically force the blocks outwardly. The cone 177 is slidably mounted on the hub 136 of the driven member and is restrained from excessive movement by a collar 178. The cone has a hub portion 179 which has an annular groove 180 adapted to coact with a roller 181 (Fig. 12) carried by a lever 182 (Figs. 12 and 14) which is pivoted at 183 to a stationary part of the truck and which has normally extending arm 184 which is pivotally connected to the link 172 which operates the brake toggle. A third arm 186 of the lever 182 is connected by a link 187 to the core of a suitable solenoid 188. A battery or other source of power for the motor 30a is connected by wiring 191 to the solenoid, switches 192 and 193 serving to energize the motor and solenoid respectively.

From the above construction it is apparent that when power is applied to the motor the solenoid will cause the brake to be released and simultaneously free the clutch rollers 130 which will cause immediate engagement of the clutch thereby driving the lifting cable drum 36a. When it is desired to operate the tilting mechanism the switch 193 is operated independent of the switch 192, thereby operating the motor while the solenoid 188 remains inactive and hence the clutch and drum 36a are idle.

The clutch illustrated in Figs. 11 to 14 inclusive does not positively drive the driven member in a counter-clockwise or cable unwinding direction. However, the load of the carriage 15 on the cable is sufficient to cause a counter-clockwise movement of the driven member. This movement however, should the solenoid switch be thrown when the motor is idle, will have practically no effect on the driven member as it will only lock the rollers into engagement with the driving member which is stationary when the motor is inoperative, hence the driven member will not rotate. For the same reason, when the direction of the motor is reversed by the reversing switch 195, the driven member cannot rotate faster than the driving member and the downward travel of the carriage and platform is therefore limited by the speed of the motor, which is at all times under the control of the operator.

Due to the momentum of the parts there is a possibility of the driven member rotating a brief interval after the cable is relieved of the weight of the carriage by the latter resting on the frame of the truck. This would permit the cable to become slack and possibly cause serious damage to the parts, hence a friction brake is applied to the driven member to prevent this excess movement. The pinion 116 is secured to the driven member and meshes with the gear 117 rigid with the shaft 118 which carries the cable drum 36a. Rigidly secured to the pinion 116 is a disc 205 against which a friction disc 206 is urged by suitable compression springs 207. The disc 206 is carried by a disc 208 which is slidably mounted on a squared hub 210 of a stationary bearing member 211 which is secured to the frame. The compression springs 207 are interposed below the disc 208 and the bearing member, the pressure of the springs being sufficient to overcome the momentum of the parts thereby preventing the cable from becoming slack.

Fig. 15 illustrates a clutch slightly differing from the clutch of Figs. 11 to 14 in that the recess 127a tapers both to the right and left towards a concentric portion 126a of the driven member. The action of this form is similar to that shown in Fig. 13 except that the driven member will be positively driven in the reverse direction and is not dependent upon the weight of the carriage to rotate the drum.

From the foregoing description it is apparent that we have provided a load handling mechanism which is especially adapted to be used in an industrial truck of the tier lift type and wherein the load may be tilted in a simple and efficient manner and wherein one motor may be used to raise the load and subsequently tilt it and we have provided a clutch mechanism to control the various cable winding drums which is accurate positive, and which will not permit accumulating errors to injure the load or mechanism and wherein the load lifting cable drum may be dis-engaged from the power unit at will and without danger of dropping the load and wherein the clutch mechanism is so constructed as to prevent the cable from becoming slack.

It will also be apparent to those skilled in the art that the mechanisms disclosed herein are adaptable to a variety of load hoisting and shifting movements. For example, if it were desired to tilt the load so that the load would spill over the side edge of the truck, the present mechanisms can be readily adapted to the obtaining of such a load movement by rearrangement of the tilting links. Likewise, the link arrangement could be such that the load could be spilled to either the right or to the left side of the platform.

We claim:

1. In an industrial truck, a main frame, a substantially vertically extending guideway carried by the frame, a carriage mounted to traverse the guideway, means adapted to raise and lower the carriage in the guideway, a platform pivoted adjacent its outermost end to said carriage, toggle links pivotally connected to the platform and carriage respectively, a third link having a slot therein and being pivotally connected to the common pivot of the toggle links, a pin rigidly secured to said platform and adapted to engage the slot in said third link, and flexible means acting on said toggle pivot to operatively tilt the platform.

2. In an industrial truck, a main frame, a substantially vertically extending guideway mounted on the frame, a carriage arranged to traverse the guideway, means adapted to raise and lower the carriage to the guideway, a platform pivoted to said carriage and having downwardly extending side flanges, a pair of toggle links pivoted to the carriage and platform respectively, a third link having a slotted opening therein and being pivotally connected to the common pivot of said toggle links, a member carried by the downwardly extended flanges of said platform and adapted to engage the slot in said last named link to limit the tilting movement of said platform, and means acting upon the common pivot of the toggle links to operatively tilt said platform.

3. In an industrial truck, a main frame, a substantially vertical guideway carried by the frame, a carriage adapted to traverse the guideway, a platform pivoted to said carriage, flexible means connected to said carriage and arranged to raise and lower the same in the guideway, a pair of toggle links pivoted to said carriage and platform respectively, a winding drum, a motor operatively connected to said winding drum, a second flexible means having one end thereof connected to the common pivot of said toggle links and passing upwardly and thence downwardly to said winding drum to operatively tilt the platform, and a link connected to the common pivot of the toggle and having a pin and slot connection with said platform to limit the tilting movement of said platform.

In testimony whereof, we hereunto affix our signatures.

ALBERT R. GOLRICK.
ROBERT H. McBEAN.